United States Patent
Sheu et al.

(10) Patent No.: US 6,310,860 B1
(45) Date of Patent: Oct. 30, 2001

(54) METHOD FOR TRAFFIC MONITORING PORT OF THE NETWORK SWITCH

(75) Inventors: Jeong-Fa Sheu; Ming-Jen Tseng, both of Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 0 days.

(21) Appl. No.: 09/118,037

(22) Filed: Jul. 17, 1998

(30) Foreign Application Priority Data

Dec. 2, 1997  (TW) .................................................. 86118074

(51) Int. Cl.⁷ .................................................. G01R 31/08
(52) U.S. Cl. .......................... 370/252; 370/253; 709/224
(58) Field of Search ..................................... 709/223, 224, 709/220, 221, 222; 370/241, 246–7, 250, 251, 252–3, 254, 445, 400–2

(56) References Cited

U.S. PATENT DOCUMENTS

| 5,079,765 | 1/1992 | Yasuo . |
| 5,315,580 | 5/1994 | Phaal . |
| 5,572,352 | * 11/1996 | Carbone, Jr. et al. ................ 359/177 |
| 5,627,766 | 5/1997 | Beaven . |
| 5,642,217 | * 6/1997 | Carbone, Jr. et al. ................ 359/177 |
| 5,892,924 | * 4/1999 | Lyon et al. ............................ 709/245 |
| 5,905,781 | * 5/1999 | McHale et al. .................... 379/93.14 |
| 5,920,705 | * 7/1999 | Lyon et al. ............................ 370/409 |

* cited by examiner

*Primary Examiner*—David R. Vincent
(74) *Attorney, Agent, or Firm*—Birch, Stewart, Kolasch & Birch, LLP

(57) ABSTRACT

This invention provides traffic monitoring ports of a network switch which are control gates, each connected with a port of the network switch. The control gates also connect with a monitoring bus, and a configuration bus. The users can apply the control gates to dominate the traffic direction via the configuration bus, using the monitoring bus to transfer communication materials. This makes the traffic of any port monitored by the other port. This invention provides users with a simply operated network monitoring function, and a completed function of the monitoring port.

2 Claims, 5 Drawing Sheets

METHOD FOR TRAFFIC MONITORING PORT OF THE NETWORK SWITCH

FIELD OF THE INVENTION

This invention provides traffic monitoring ports of a network switch which are control gates, each connected with a port of the network switch. The control gates also connect with a monitoring bus, and a configuration bus. The users can apply the control gates to dominate the traffic direction via the configuration bus, using the monitoring bus to transfer communication materials. This makes the traffic of any port monitored by the other port. This invention provides users with a simply operated network monitoring function, and a completed function of the monitoring port.

DESCRIPTION OF THE PRIOR ART

A network switch connects with the user devices through its connecting port. Sometimes there is a need to verify the traffic of a port, so that it can be monitored, such as when processing debugging and observing any port's data flow.

FIG. 1 shows the commonly used technique for monitoring the port traffic. The network switch 10 has connection ports 12, which connect with user devices 14. When the traffic monitoring is processed, as shown on the left side of the FIG. 1, the user device 14 is first disconnected. The repeater 16 connects with a port 12, which is configured as a monitoring port. In addition, a sniffer 18 and the user device 14, then connect with the repeater 16, so that the traffic passing through the user device 14 is monitored by the sniffer 18.

The above described method of monitoring the traffic must change the network connection to monitor it. The monitoring depends on the port's position, which is not easy to operate. This problem can be solved by using a fixed monitoring port instead of using a repeater 16, as shown on FIG. 2. Setting up a dedicated monitoring port 20 means sacrificing one port's ordinary function, wasting the cost by eliminating the port.

This general way of monitoring the network only monitors parts of the traffic, such as the result of transmission or reception which cannot perform the completed monitoring whole traffic. So the result does not reach its goal.

Anyhow the general technique of monitoring traffic of the network works only the receiving parts of the half duplex operation, and it does not work in full duplex operation. Based on the above mentioned factors, it is necessary to propose a more complete, easier to operate design, to improve the defects of the existing technique of network monitoring.

SUMMARY OF THE INVENTION

An object of this invention is to provide an easy to operate traffic monitoring port for network switches. By this device, monitoring traffic of any port of the network switch can be done by using another arbitrary port of the switch, without changing the original settings of the switch.

Another object of this invention is to provide traffic monitoring ports to monitor the full duplex operation of the network switch. This is achieved using a couple of ports, one for monitoring transmitted packets from the monitored port, and one for monitoring received packets to the monitored port.

A third object of this invention is to provide traffic monitoring ports to monitor the entire traffic of the network, and also the local traffic and error packet. This new method does not sacrifice a port's ordinary function when the port is not set on monitoring mode.

In order to achieved these objects, this invention uses control gates to connect every port of the network switch, and connects every control gate with the monitoring bus and configuration bus. The user devices interface can select a control gate to control the traffic direction through the configuration bus, utilizing the monitoring bus to transfer traffic materials. This allows the traffic of any port to be monitored by another port. dr

BRIEF DESCRIPTION OF THE DRAWINGS

The present invention will be more fully understood by reference to the following detailed description thereof when read in conjunction with the attached drawings, and wherein.

Figure 1:
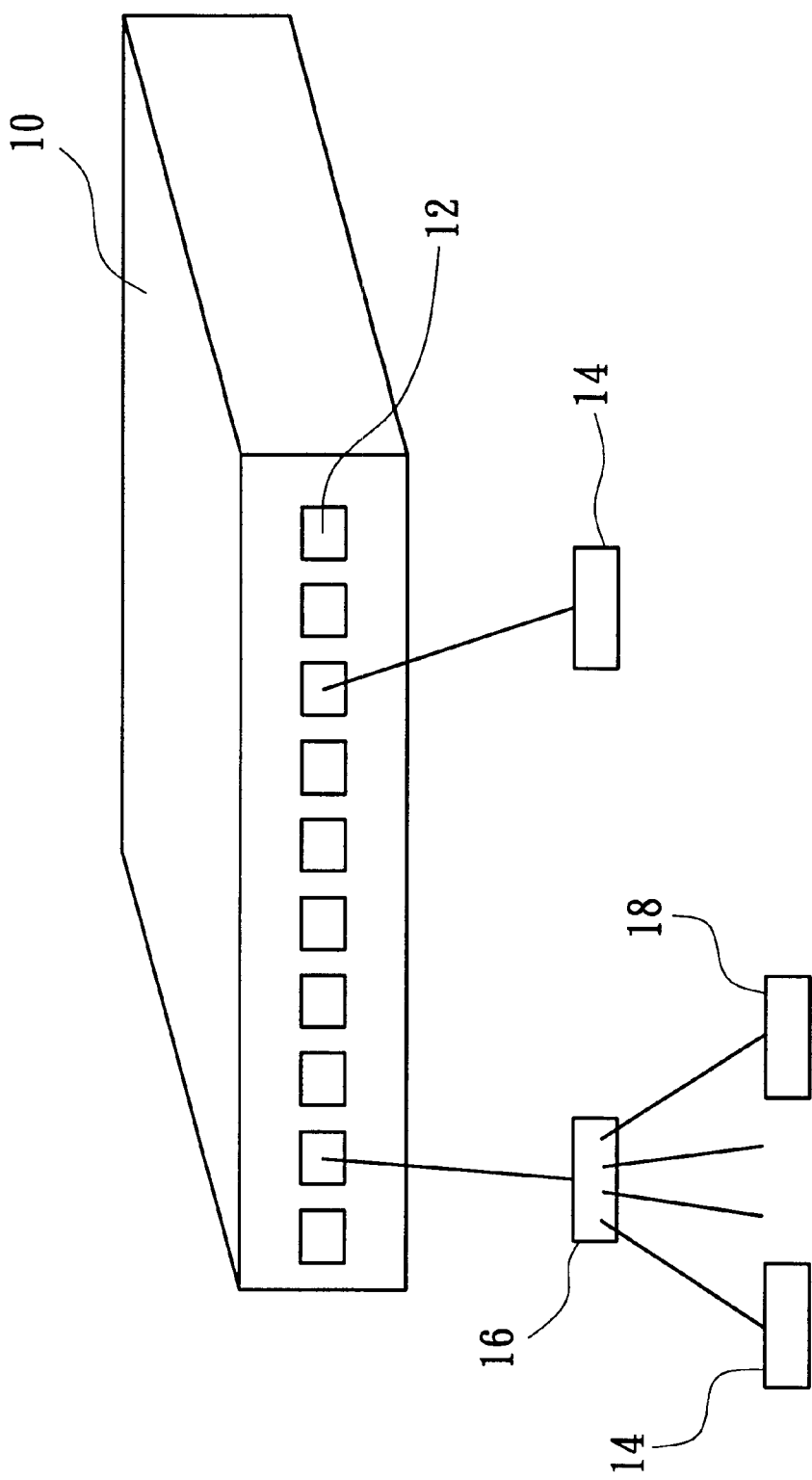
FIG. 1 shows the general technique of monitoring the traffic of a network switch by using repeaters.
Figure 2:
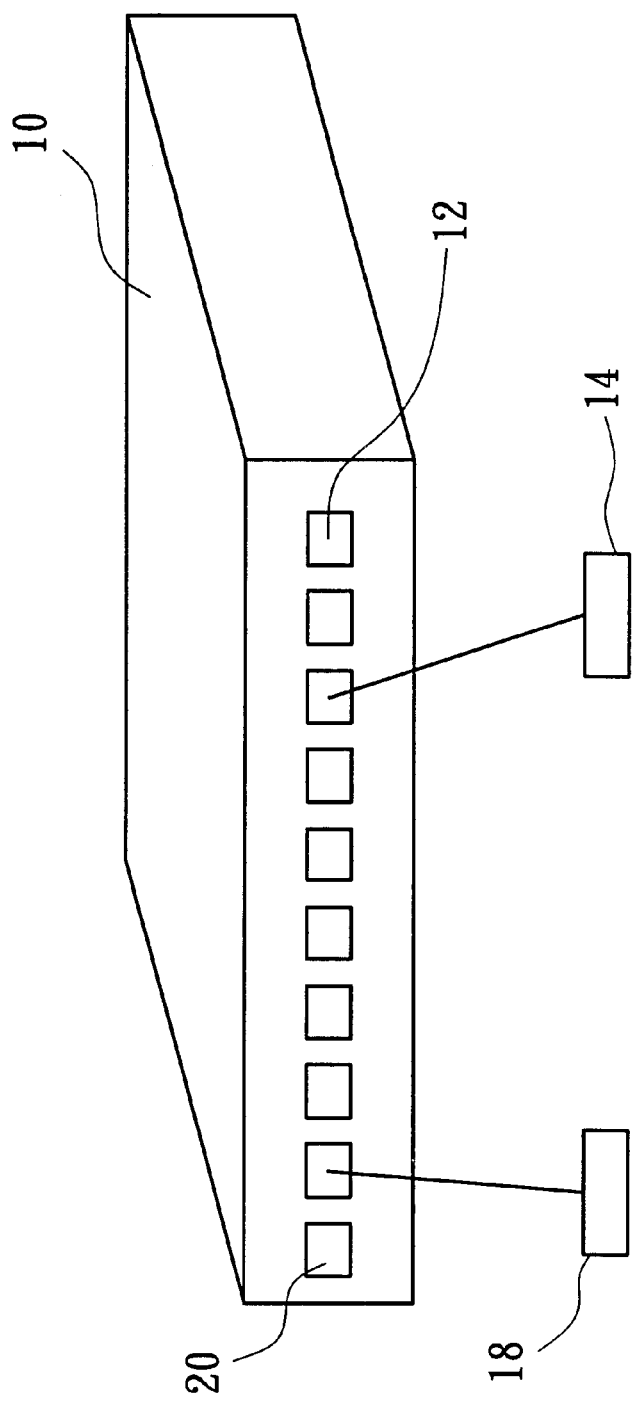
FIG. 2 shows the general technique of monitoring the traffic of a network switch by using a fixed monitoring port.

REFERENCE NUMERALS IN THE DRAWINGS 10 network switch
12 port
14 user devices
16 repeater
18 sniffer
20 monitoring port
22 exhange engine
24 user devices
26 user configuration interface
28 configuration bus
30 monitoring bus
32 control gate
34 monitored module
36 monitoring module
38 PHY
40 sniffer

DETAILED DESCRIPTION OF THE PREFERRED EMBODIMENT

This invention can monitor the traffic of any port of the network switch by using another port of the network switch. This distinguishes this invention from the prior technique of switches and traffic monitoring.

Figure 3:
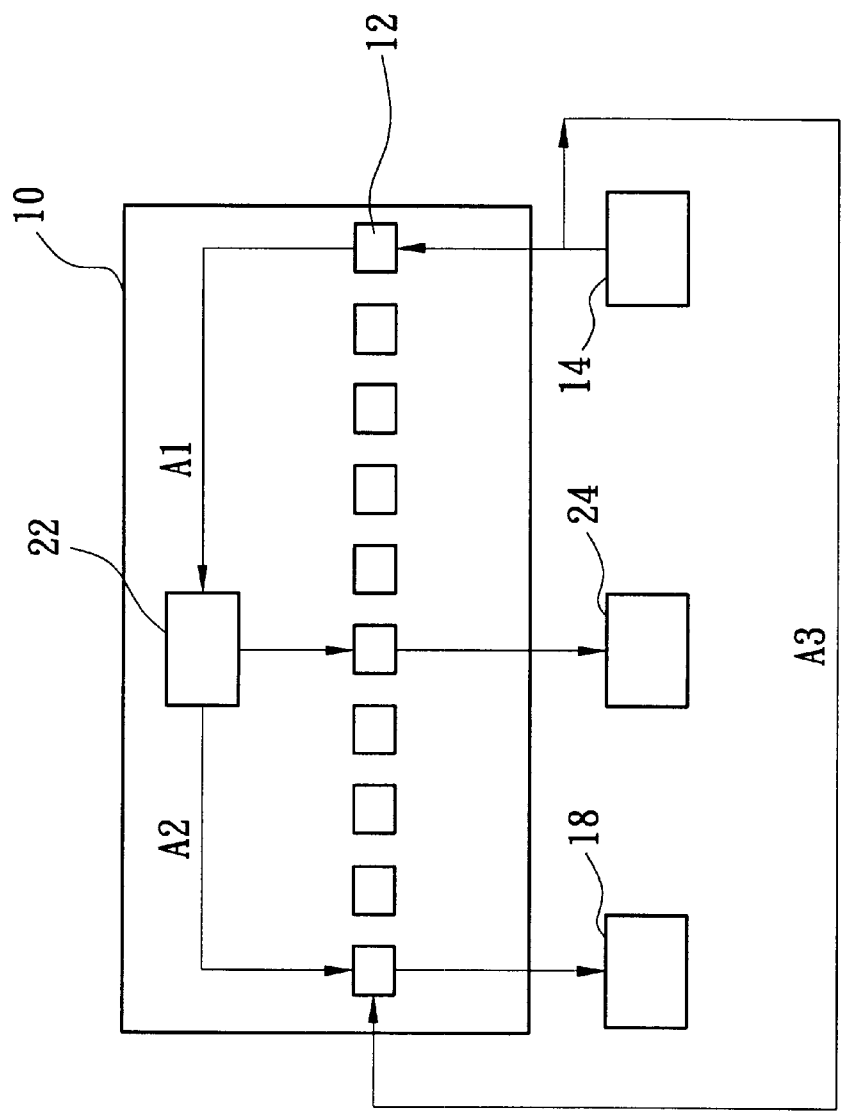
FIG. 3 shows the theory of this invention.

When user devices 14 transfer materials to other network user devices 24, the path is shown as arrow A1 on the right side of FIG. 3, through the exchange engine 22. The method is to copy the materials from the exchange engine, and send it to the sniffer 18. The path of the prior method is shown as arrow A2 on the left side of the figure. The sniffer 18 can thus get the same materials as the user devices 24, and verify the traffic. The prior method has an inherent default in that the local traffic and the packet cannot be monitored. Monitoring traffic of the prior method is not a complete monitoring.

This invention is to send materials from user devices 14 directly to the sniffer 18, shown as arrow A3 on the bottom of FIG. 3. The content of the traffic of user devices 14 is monitored by the sniffer 18. The monitoring traffic is identical to the network traffic, not a modification of the network traffic.

Every port has three working modes in this design: normal mode for normally transmitting and receiving packets carried on the networks, monitored mode for reproducing monitored packets to a monitoring bus, and monitoring mode for mirroring the monitored packets from the monitoring bus. The monitoring materials are transferred out through path TX at the monitoring port, that is, the port then can't transmit general network traffic. When a port is configured as normal or monitored modes, it can transmit and receive packets on the network normally.

Figure 4:
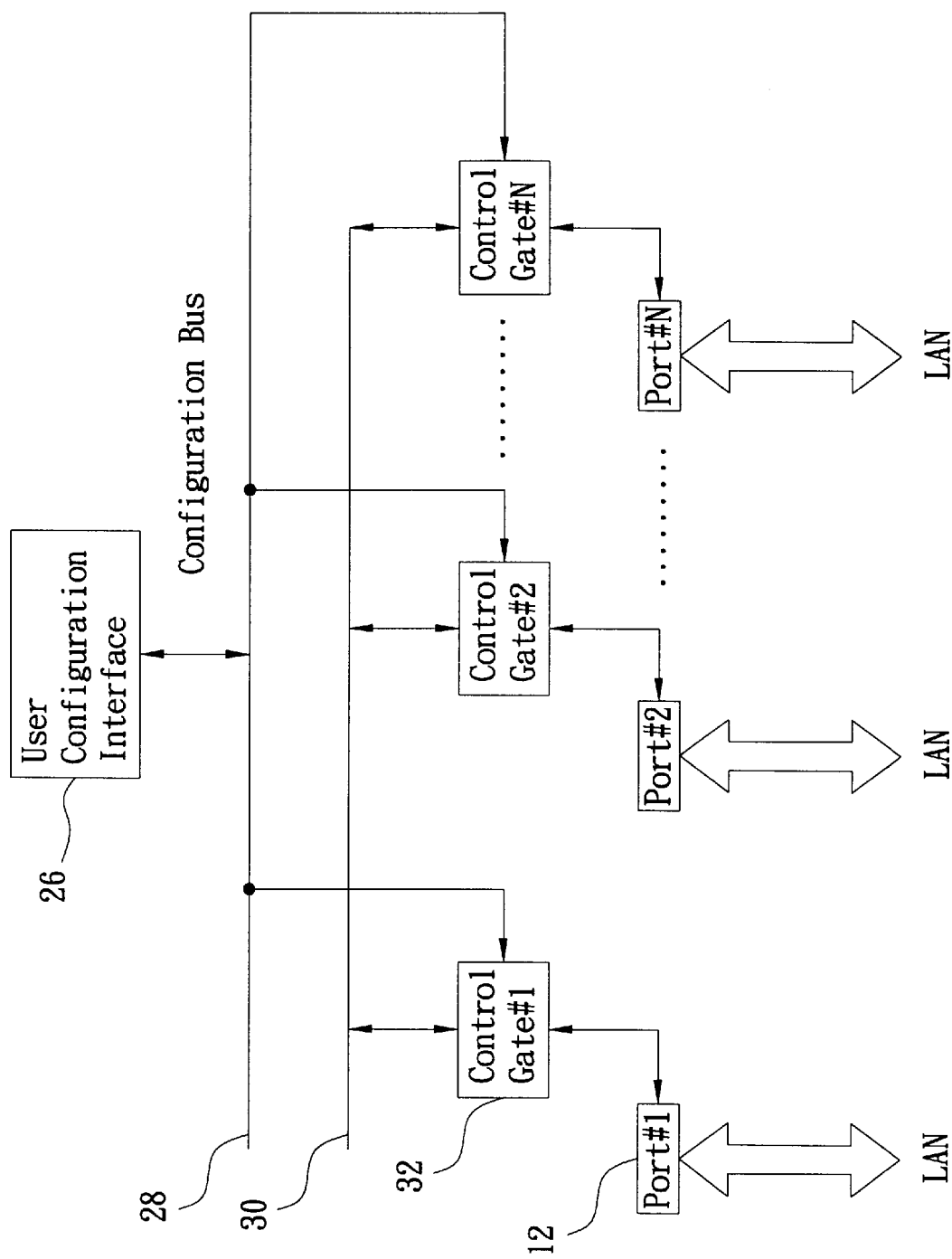
FIG. 4 shows a good example of this invention.

FIG. 4 shows an example of the execution of the above mentioned method. In a network switch 10 the user configuration interface 26 connects with a configuration bus 28, then connects with every control gate 32. The monitoring bus 30 connects with every gate 32. The user configuration interface 26 selects a control gate 32 to control the traffic direction through the configuration bus 28, so that the traffic materials from a port to any other port can be transferred to the monitoring bus 30, and the traffic is monitored by another port.

Figure 5:
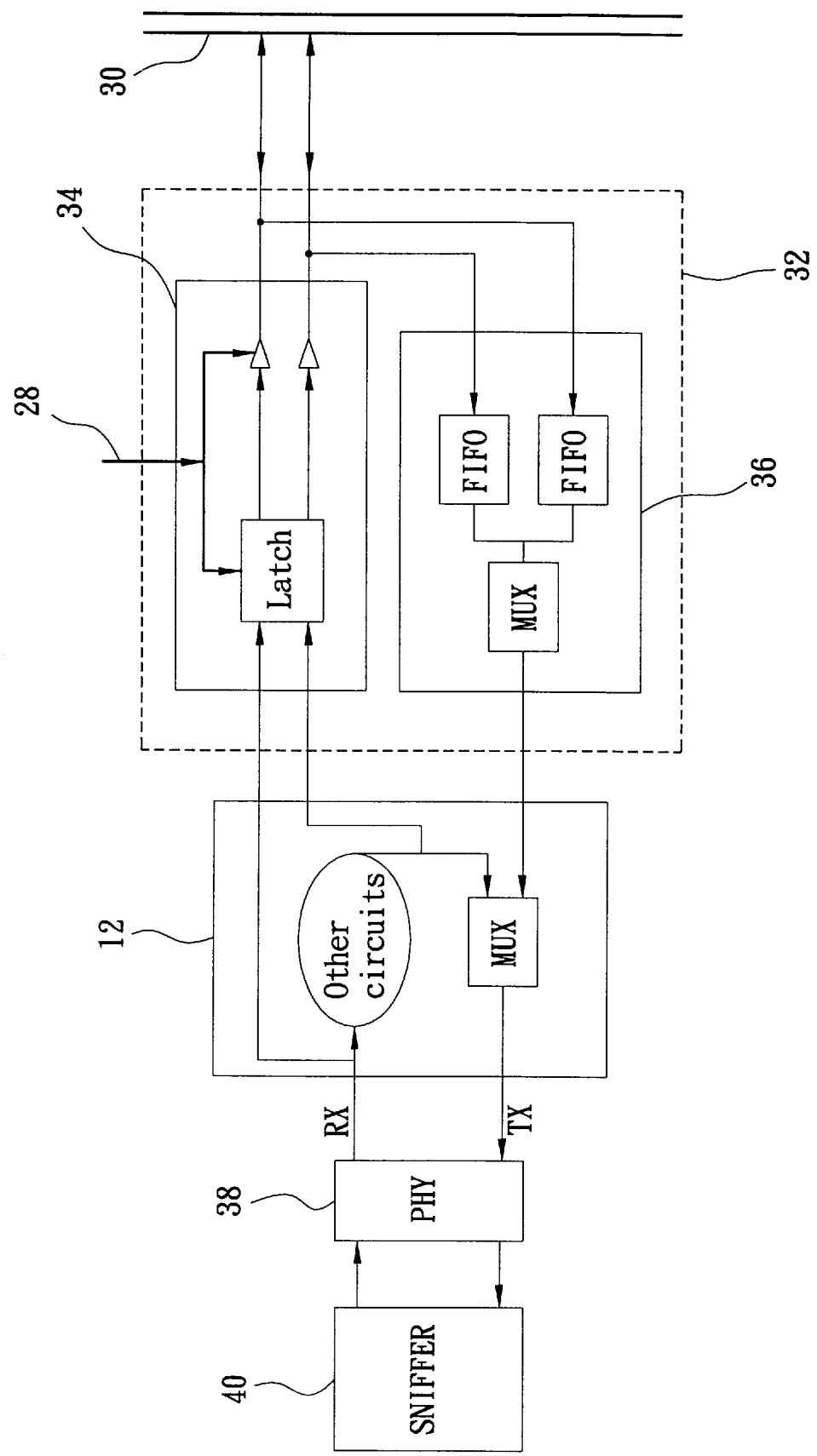
FIG. 5 shows the block diagram of the invention.

The control gate mainly works as a data selector and provides the ability to restore the timing of the monitored signals prior to retransmission. A control gate connected with a port consists of monitored module 34 and monitoring module 36, as shown in FIG. 5. the traffic passing through the port 12 is duplicated to monitoring bus 30, via monitored module when the port is set as monitored mode. Under monitoring mode, the monitoring module of the control gate receives the monitoring packets, including RX and TX data, from the monitoring bus. The monitored packets on the monitoring bus first queue up in FIFOs. Then those packets forward to the TX path of this port based on TXC associated with the port. This methodology shall ensure that the timing of the monitoring data output at a monitoring port are within the specified tolerance for the appropriate PHY type 38. It guarantees that the sniffer 40 used to monitor packets can receive correct monitoring signals.

For an example, to monitor the traffic of port #1, control gate #1 is instructed to create the path to the monitoring bus 30, and sends the reproduced materials to the monitoring bus 30. Meanwhile, control gate #2 also constructs the path to the monitoring bus 30 and sends out the materials from port #2. That is port #1, control gate #1, monitoring bus, control gate #2 and port #2 form a traffic monitoring path. Obviously, in order to monitor the traffic, port #2 must also connect with the sniffer 18.

This method is not limited to using only one port to monitor the traffic. This invention can use multiple ports to separately monitor transmission and reception of a port, when it works under full duplex operation.

As described in this explanation, this invention can easily monitor the traffic of one port from another port by utilizing traffic direction controlling devices, such as the control gate of the example, and a transferring path for monitoring traffic, such as the traffic monitoring bus of the example.

The characteristics of the invention are explained above. Revisions and features other than those specifically described above may be developed by those skilled in the art, however it is within the present invention to provide obvious modifications of the preferred embodiment.

We claim:

1. A traffic monitoring port of network switches comprising: a user configuration interface, providing users an interface to set up the configuration of a network switch having a plurality of ports; a configuration bus, connecting with said user configuration interface for transferring configuration data; a plurality of control gates, every control gate being connected with the configuration bus and is instructed to open or close; and a connection port, each port connecting a control gate to said configuration bus; wherein the user configuration interface selects a control gate, controls the direction of traffic, uses the monitoring bus to transfer the traffic packets of the monitored port, and makes the traffic of any port available for monitoring by another port.

2. The traffic monitoring port of claim 1, wherein the network switch is an Ethernet switch.

* * * * *